March 22, 1932. T. KURTZ 1,850,554
ROLLER BEARING JOURNAL BOX
Filed Nov. 27, 1928
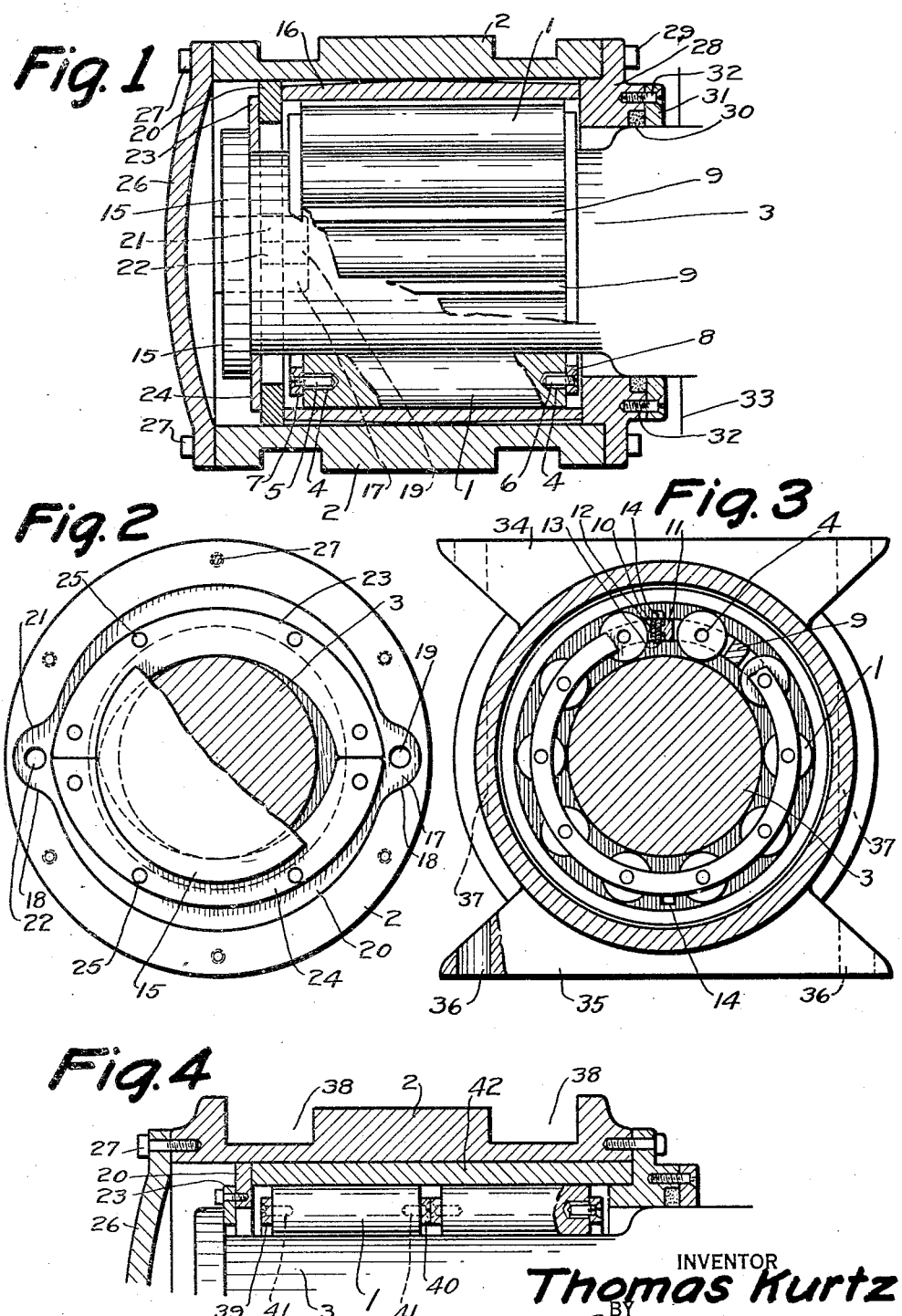
INVENTOR
Thomas Kurtz
BY
Harry Bowen
ATTORNEY Patented Mar. 22, 1932

1,850,554

UNITED STATES PATENT OFFICE

THOMAS KURTZ, OF SEATTLE, WASHINGTON

ROLLER BEARING JOURNAL BOX

Application filed November 27, 1928. Serial No. 322,287.

The invention is a roller bearing journal box which is particularly adaptable for the journals of wheels of railway coaches and may be applied in the standard frame and without removing the collar from the end of the shaft.

The object of the invention is to provide a roller bearing that may readily be applied to the shafts of railway coaches without removing the collar at the end of the shaft and without changing the frame in which the bearing is located.

Another object of the invention is to provide a journal for railway coaches that has a higher degree of efficiency than the bronze bushing bearings now used which can be installed without changing the frame or shaft.

Another object of the invention is to provide a journal for the shafts of railway coaches which may readily be removed and replaced.

A further object of the invention is to provide a jointed roller frame for a roller bearing which is adaptable to be placed over the end of a railway coach shaft.

And a still further object of the invention is to provide a roller journal box for railway coaches which may readily be removed and replaced without changing the shaft or frame and which is of a simple and economical construction.

With these ends in view the invention embodies, a roller bearing with the rollers mounted in two semi-circular spacers adaptable to be joined together, a housing adaptable to be placed in a journal frame, a sleeve with a tapered outer surface between the rollers and housing, suitable closures at the ends and suitable removable thrust collars at the outer end.

Other features and advantages of the invention will appear from the following description taken in connection with the drawings, wherein:

Figure 1 is a longitudinal section through the journal box with part of the rollers shown in full and part broken away.

Figure 2 is an end elevation with the cover plate removed and part of the shaft broken away.

Figure 3 is a cross section through the journal.

Figure 4 is a longitudinal section similar to that shown in Figure 1, showing the upper portion of a journal of an alternate design which is particularly adaptable for shafts of large diameters.

In the drawings the device is shown as it would be made, wherein numeral 1 indicates the rollers of the roller bearing, numeral 2 the housing and numeral 3 the shaft.

The rollers 1 may be made of any suitable size and of any suitable material and in the design shown are provided with openings 4 in their ends into which screws 5 and 6 in rings 7 and 8 extend as shown in Figure 1. Each of the rings 7 and 8 are made in two semi-circular sections and connected with cross bars 9 between the rollers as shown. At the ends of the semi-circular sections of the rings 7 and 8 are bars 10 and 11, one of which is provided with tongues 12 that extend into recesses in the other and these tongues are held by screws 13 having wires 14 extending through openings in their ends to prevent them working loose. In the design shown in Figure 3 the rings are broken away at the upper side only, however it will be understood that a similar connection is provided at the opposite end of the rings on the opposite side of the center. It will be noted that the openings 4 in the ends of the rollers into which the pins 5 and 6 project are slightly larger than the pins so that the rollers will not bind on the pins. It will be noted that the outer end of the axle or shaft 3 is provided with a collar 15 that is somewhat larger than the diameter of the shaft so that it is necessary to mount the rollers in a split frame or spacer and with the frame made in this manner it is possible to remove the screws 14 and the two semi-circular sections may be removed from the shaft or installed upon the shaft independently.

The rollers are directly mounted in a sleeve, 16 the outer surface of which tapers toward the ends as shown in Figure 1 to provide a small amount of play in the bearings to compensate for the rise and fall of the wheel in the shaft as it passes over an uneven track.

The sleeve 16 is provided with ears 17 at the sides which fit into notches 18 in the housing 2 as shown in Figure 2. These ears are provided with openings 19 in which pins or bars may be inserted to draw the sleeve outward or out of the end of the housing. These ears also prevent the sleeve rotating within the housing.

At the end of the sleeve 16 is a ring 20 which is also provided with ears 21 that are similar to the ears 17 of the sleeve 16 and these ears are also provided with openings 22 which are similar to the openings 19. The outside diameter of the ring 20 corresponds with the inside diameter of the housing 2 and the inside diameter of the ring is slightly larger than the outside diameter of the collar 15 at the end of the shaft 3 so that the ring may pass outward over the collar. Between the ring 20 and the collar 15 is a split thrust collar formed by two substantially semi-circular rings 23 and 24 which are attached to the ring 20 by screws 25 as shown in Figure 2. These substantially semi-circular members are shaped so that they may be removed between the outer surface of the collar 15 and the inner surface of the housing, the larger radius being equal to the radius of the internal diameter of the housing and the smaller radius being equal to the radius of the collar 15. These members are positioned as shown in Figure 2 and it will be observed that the collar 15 will engage them as the shaft 3 moves inward. The outer end of the housing 2 is provided with a cap 26 which is held to the housing 2 by bolts 27 as shown. The opposite end of the housing 2 is provided with a cover 28 which is held to the housing by bolts 29 and this cover is provided with a packing gland 30 having a closure 31 held to the outer end by screws 32. The outer surface of the closure 31 is spaced a slight distance from the face of the wheel hub which is indicated by the numeral 33 and shown in Figure 1.

The housing 2 is provided with flanges 34 and 35 at the top and bottom which fit into the frame, and these flanges are provided with bolt holes 36 through which the bolts of the frame may pass. The sides of the housing are also recessed as shown at the points 37 to clear the bolts. This box as hereinbefore described is particularly adaptable to be placed into the frame of comparatively small axles and may fit into the frame between the bolts which pass through the wheels 36 without changing the frame or location of the bolts and also may be installed without changing the axle or the shaft.

The design shown in Figure 4 is particularly adaptable for axles of a larger diameter, however it is understood that it may also be used for the journals shown in Figures 1 to 3. In the design shown in Figure 4 the housing 2 is provided with recesses 38 through which the pedestals of the frame pass. These pedestals hold the journal box rigid in the pedestal frame. In this design the rollers 1 are provided in two units instead of one continuous roller and it will also be understood that as many units as may be desired may be provided. The rollers are held between rings 39 and 40 which are similar to the rings 7 and 8 and are attached to the rings by pins 41 which extend into enlarged holes in the ends of the rollers. The rollers are mounted in a sleeve 42 which is similar to the sleeve 16 and it will be noted that the outer surface of this sleeve is made straight instead of being tapered as shown in Figure 1. It will be understood, however, that the outer surface of this sleeve may also be tapered and also that the outer surface of the sleeve shown in Figure 1 may be made straight if desired.

It will be understood that other changes may be made in the construction without departing from the spirit of the invention, one of which changes may be in the design or arrangement of the housing, another may be in the use of closures of a different type at the ends, another may be in the use of other means for holding the rollers or in the arrangement of the spacers and another change may be in the use of other means for transmitting the thrust from the collar at the end of the shaft to the housing.

The construction will be readily understood from the foregoing description. In use the device may be installed by placing the cover 28 over the end of the shaft, then placing the two sections of rollers around the end of the shaft and attaching the sections together by the screws 13 as shown. The sleeve 16 may then be placed over the rollers and the housing placed over the sleeve. The ring 20 may then be inserted and the thrust rings 23 and 24 inserted between the ring 20 and the collar 15 and then bolted to the ring 20. The cover 26 may then be attached to the outer end of the casing and the cover 28 to the inner end. The bolts may then be passed through the openings 36 to hold the device in place.

It will therefore be observed that the device may readily be installed and by the same process may readily be removed and when in use will provide a comparatively frictionless bearing which will withstand the enormous load of a railway coach and which may readily be installed without changing the design of the frame or axle of the coach.

Having thus fully described the invention, what I claim as new and desire to secure by Letters Patent, is:

In a journal of the class described, a housing adaptable to fit into the journal frame of a railway car with the axle extending therein, rollers positioned around the end of the axle, a split frame in which the said rollers are mounted, means for holding the sections of the frame together, a sleeve with a tapered outer surface which tapers from a large diameter at the center to a smaller diameter at the ends, over the rollers and within the housing, a collar at the outer end of the sleeve with lugs extending into notches in the housing, a readily removable friction ring between the said collar and the permanent collar at the outer end of the axle, a suitable cap forming a closure at the outer end of the said housing, a collar at the inner end of the housing engaging the tapered sleeve and transmitting the thrust from the collar at the end of the axle to the housing through the collars at the outer end, and a packing gland in the collar at the inner end.

In testimony whereof I affix my signature.

THOMAS KURTZ.